(12) United States Patent
Wills

(10) Patent No.: US 7,562,524 B2
(45) Date of Patent: Jul. 21, 2009

(54) APPARATUS, SYSTEM, AND METHOD FOR ESTIMATING PARTICULATE CONSUMPTION

(75) Inventor: J. Steve Wills, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 189 days.

(21) Appl. No.: 11/227,403

(22) Filed: Sep. 15, 2005

(65) Prior Publication Data

US 2007/0056273 A1    Mar. 15, 2007

(51) Int. Cl.
    *F01N 3/00*    (2006.01)
(52) U.S. Cl. .............................. 60/297; 60/295; 60/286; 60/301; 60/303; 60/311
(58) Field of Classification Search .................. 60/274, 60/276, 278, 280, 285, 286, 295, 297, 303, 60/311
    See application file for complete search history.

(56) References Cited

U.S. PATENT DOCUMENTS

| | | | |
|---|---|---|---|
| 6,405,528 B1 | 6/2002 | Christen et al. | 60/295 |
| 6,622,480 B2 | 9/2003 | Tashrio et al. | 60/295 |
| 6,634,170 B2 * | 10/2003 | Hiranuma et al. | 60/295 |
| 6,756,904 B2 | 6/2004 | Kinugawa et al. | 340/606 |
| 6,758,039 B2 | 7/2004 | Kuboshima et al. | 60/311 |
| 6,805,095 B2 * | 10/2004 | Sun et al. | 123/399 |
| 6,820,418 B2 * | 11/2004 | Nakatani et al. | 60/297 |
| 6,829,889 B2 | 12/2004 | Saito et al. | 60/291 |
| 6,829,890 B2 | 12/2004 | Gui et al. | 60/295 |
| 6,854,265 B2 | 2/2005 | Saito et al. | 60/295 |
| 6,907,873 B2 | 6/2005 | Hamahata | 123/676 |
| 6,941,750 B2 * | 9/2005 | Boretto et al. | 60/297 |
| 7,054,734 B2 | 5/2006 | Todoroki et al. | |
| 7,111,455 B2 * | 9/2006 | Okugawa et al. | 60/295 |
| 7,137,246 B2 | 11/2006 | van Nieuwstadt et al. | |
| 7,162,867 B2 * | 1/2007 | Saito et al. | 60/295 |
| 7,169,364 B2 | 1/2007 | Ohtake et al. | |
| 7,264,642 B2 * | 9/2007 | Hamahata et al. | 55/282.3 |
| 2002/0196153 A1 | 12/2002 | Kinugawa et al. | 340/606 |
| 2003/0167757 A1 | 9/2003 | Boretto et al. | 60/295 |
| 2004/0172933 A1 | 9/2004 | Saito et al. | 60/277 |
| 2004/0204818 A1 | 10/2004 | Trudell et al. | 701/114 |

OTHER PUBLICATIONS

PCT International Search Report and Written Opinion, May 6, 2008.

* cited by examiner

*Primary Examiner*—Binh Q Tran
(74) *Attorney, Agent, or Firm*—Kunzler & McKenzie

(57) ABSTRACT

An apparatus, system, and method are disclosed for robustly estimating soot oxidation rates on a particulate filter. The invention uses empirically measured soot consumption rates as defined boundary rates, and operates between those rates using theoretical relationships between soot consumption and various operating conditions. The invention may also operate outside the defined boundaries by extrapolating the theoretical relationships beyond the defined boundary. The invention thereby overcomes the inflexibility of empirical modeling by allowing reasonable estimates at points that are not explicitly measured, and it overcomes the sensitivity of theoretical models to non-idealities that are experienced in real applications.

16 Claims, 12 Drawing Sheets

Empirical Boundary Conditions Module
202

Boundary Soot Consumption Rates
402

Noxidation High Rate
316

Noxidation Low Rate
318

Defined Operating Conditions
408

Particulate Filter Temperature
320

$NO_2$ Mass Flow
322

Soot Loading
324

Fig. 4

Defined Relationship Module
204

Plurality of soot consumption ratios
502

Range of soot loading values
504

Plurality of soot consumption ratios
506

Range of O₂ mass fraction values
508

Plurality of soot consumption ratios
510

Range of particulate filter temperature values
512

Defined Relationship Module
204

Range of soot loading values
604

Range of NO$_2$ mass flow values
608

Range of particulate filter temperature values
612

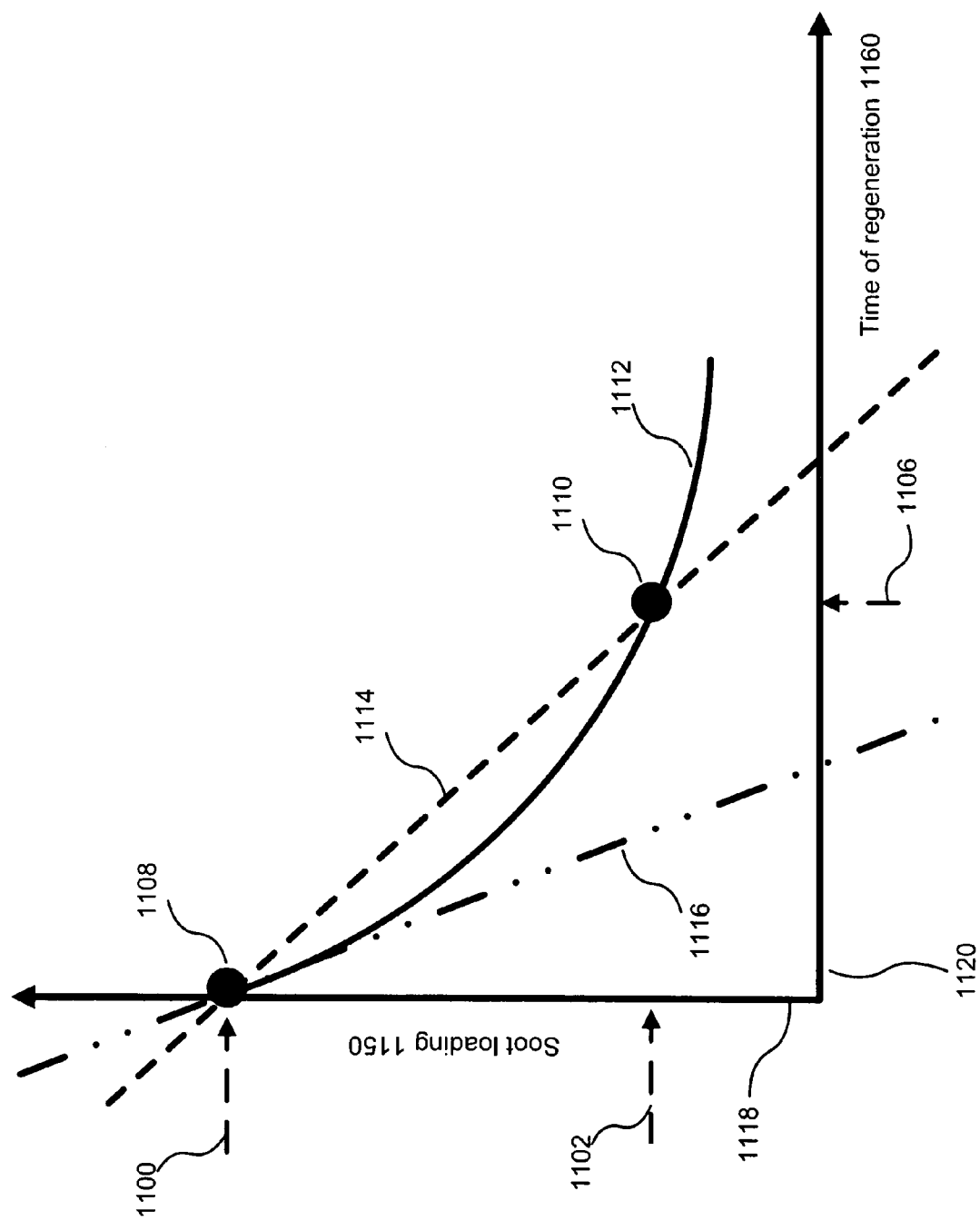

APPARATUS, SYSTEM, AND METHOD FOR ESTIMATING PARTICULATE CONSUMPTION

BACKGROUND OF THE INVENTION

1. Field of the Invention

This invention relates to model implementation and more particularly relates to apparatuses, systems, and methods for combining theoretical and empirical knowledge as an improvement over a purely theoretical or purely empirical model.

2. Description of the Related Art

Modern diesel emissions regulations are driving engine manufacturers to use particulate filters in engine aftertreatment systems. These filters accumulate soot over time, and the soot must be removed from the filter periodically.

There are two primary mechanisms for removing the soot. The engine naturally generates some $NO_2$ in the exhaust stream. At low temperatures, this $NO_2$ oxidizes some of the soot on the filter, releasing the soot—typically as CO or $CO_2$. This mechanism is called "noxidation."

The noxidation mechanism is often insufficient to keep the particulate filter at acceptable soot levels. Therefore, a faster oxidation mechanism is sometimes required. One implementation of this mechanism is to raise the temperature of the exhaust stream to the point where simple $O_2$ will oxidize the soot. This temperature is higher than where the engine will typically run under normal loads and therefore must generally be triggered intentionally by the engine controls. This mechanism is called "oxidation."

The oxidation of soot through either mechanism—"oxidation" or "noxidation"—is called "soot consumption."

The oxidation mechanism consumes soot at a much higher temperature and much more quickly than the noxidation mechanism. If the soot level is too high in the particulate filter when the oxidation mechanism is initiated, oxidation can generate heat within the particulate filter much more quickly than the rate at which the heat can be dissipated. This causes local temperature spikes within the particulate filter, and can result in unnecessary wear on the particulate filter or even mechanical failure of the particulate filter. A runaway heat spike like this is called an "uncontrolled regeneration."

Before an oxidation-based regeneration is attempted, the controller must be as sure of the overall soot level as possible. The primary feedback mechanism to determine the soot level on the particulate filter is the use of a delta-pressure sensor across the particulate filter. With a known flow rate and pressure drop, the amount of soot on the particulate filter can be estimated. Even in the ideal case, this feedback mechanism is still only intermittently dependable for determining soot levels. First, whenever mass flow through the system is low, the delta-pressure based soot load estimate is known to be unreliable. Further, while soot is being consumed on the particulate filter, the delta-pressure sensor is known to become unreliable due to holes developing in the soot layer.

An independent measure of the rate of soot consumption on the soot filter would help properly utilize the delta-pressure sensor for estimating soot loading on the particulate filter, and would help in optimizing and limiting heat generation within the particulate filter. Therefore, a model of soot generation and consumption rates and overall soot levels on the particulate filter is desirable to be used in some combination with the feedback mechanism.

Purely empirical models of soot consumption rates are problematic. Any given system must have data for every possible operating point to build a data map. This is impossible, so some shortcuts must be taken and there will be operating points between and outside the data set which will yield poor results.

Purely theoretical models are also problematic. Regarding the noxidation mechanism, the relation depends strongly upon the temperature of the particulate filter. The temperature within the particulate filter experiences gradients and localized variances which temperature measurements available for production engines cannot describe adequately. Therefore, practical observations of noxidation rates often vary considerably from the theoretically derived models.

Regarding the oxidation mechanism, the relation depends even more strongly upon the temperature of the particulate filter than for noxidation. The oxidation mechanism is also more sensitive to soot loading than the noxidation mechanism, making any such model sensitive to soot loading and distribution errors. These combine to cause the achieved oxidation rates to be different—often lower—than theoretically derived models suggest.

The value of interest for the use of these models—the soot loading on the particulate filter—is not the direct output of the model, but rather the integration of the model output over time. Therefore, errors from the models to the value of interest accumulate over time and become larger. Even in a theoretically sound model, the errors in oxidation and noxidation rates can accumulate to the extent that within one hour, the particulate filter can be completely full and appear completely clean to the model, or the particulate filter can be completely clean and appear completely full to the model. The inherent issues with the available soot load feedback mechanisms can force the system to not have a reliable feedback mechanism for many hours at a time. Therefore, current systems can have large stretches of time where no information is available about the current soot loading.

From the foregoing discussion, it should be apparent that a need exists for an apparatus, system, and method that can overcome the limitations of both the theoretical and the empirical models for estimating soot consumption rates. Beneficially, such an apparatus, system, and method would be calibratible with just a few parameters, and from the types of measurements that are already typically made in the field.

SUMMARY OF THE INVENTION

The present invention has been developed in response to the present state of the art, and in particular, in response to the problems and needs in the art that have not yet been fully solved by currently available modeling techniques. Accordingly, the present invention has been developed to provide an apparatus, signal bearing medium, method and system for calibrating a theoretical model to empirical knowledge that overcome many or all of the above-discussed shortcomings in the art.

The apparatus, in one embodiment, is configured to store boundary soot consumption rates, and further configured to store relationship information between potential operating conditions of the system and the boundary soot consumption rates. In one embodiment, the apparatus is further configured to generate a condition index value from the current operating conditions of the system, and is further configured to generate a final output value of the current soot consumption rate utilizing the condition index value and the boundary soot consumption rates. The apparatus may include an empirical boundary conditions module for storing the boundary soot consumption rates, a defined relationship module for storing relationship information between potential operating conditions and the boundary soot consumption rates, a condition index module for determining the condition index value, and a final output value module for determining the final output value of current soot consumption rate. In one embodiment, the modules may be contained within a controller.

The apparatus is further configured, in one embodiment, to determine a soot consumption rate via the $O_2$ based oxidation mechanism. In one embodiment, the oxidation estimate further includes storing an oxidation high rate and low rate, and interpolating or extrapolating between the low rate and the high rate using the condition index value. The apparatus is further configured, in one embodiment, to use the $O_2$ mass fraction, the current soot loading on the particulate filter, and the current temperature of the particulate filter as the current operating conditions for the condition index value. In one embodiment, the apparatus is further configured to use a range of values of: $O_2$ mass fraction, soot loading on the particulate filter, and temperature of the particulate filter—as the plurality of operating conditions for which the defined relationship module stores relationships to the boundary soot consumption rates.

The apparatus is further configured, in one embodiment, to determine a soot consumption rate via the $NO_2$ based noxidation mechanism. In one embodiment, the noxidation estimate further includes storing a noxidation high rate and low rate, and interpolating or extrapolating between the low rate and the high rate using the condition index value. The apparatus is further configured, in one embodiment, to use the $NO_2$ mass flow, the current soot loading on the particulate filter, and the current temperature of the particulate filter as the current operating conditions for the condition index value. In one embodiment, the apparatus is further configured to use a range of values of: $NO_2$ mass flow, soot loading on the particulate filter, and temperature of the particulate filter—as the plurality of operating conditions for which the defined relationship module stores relationships to the boundary soot consumption rates.

A system of the present invention is also presented to treat exhaust gas emitted as a byproduct of operation of an internal combustion engine. The system may be embodied in an exhaust gas after-treatment system. In particular, the system, in one embodiment, includes sensors for determining various operating conditions, a controller configured to store a high rate of soot oxidation and a low rate of soot oxidation based on defined operating conditions, to store relationships between a plurality of potential operating conditions and the high and low soot oxidation rates, to determine a conditions index determined according to current operating conditions, and to combine the conditions index with the high rate of soot oxidation and low rate of soot oxidation to determine a rate of soot consumption on the particulate filter. The system may further include a control unit for determining operating and ambient conditions, an internal combustion engine, a particulate filter, a catalytic component, a differential pressure sensor, and a reactant delivery mechanism.

A method of the present invention is also presented for storing boundary soot consumption rates determined according to defined operating conditions, storing relationship information between a plurality of potential operating conditions and the boundary soot consumption rates, determining a condition index value determined according to current operating conditions and the stored relationship information, and combining the condition index value with the boundary soot consumption rates to produce a final output value of soot consumption rate. The method in the disclosed embodiments substantially includes the steps necessary to carry out the functions presented above with respect to the operation of the described apparatus and system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 4 is a schematic block diagram illustrating another embodiment of an empirical boundary conditions module in accordance with the present invention;

FIG. 11 is a graph illustrating a method to use easily obtainable information to more easily practice the present invention.

DETAILED DESCRIPTION OF THE INVENTION

Figure 1:
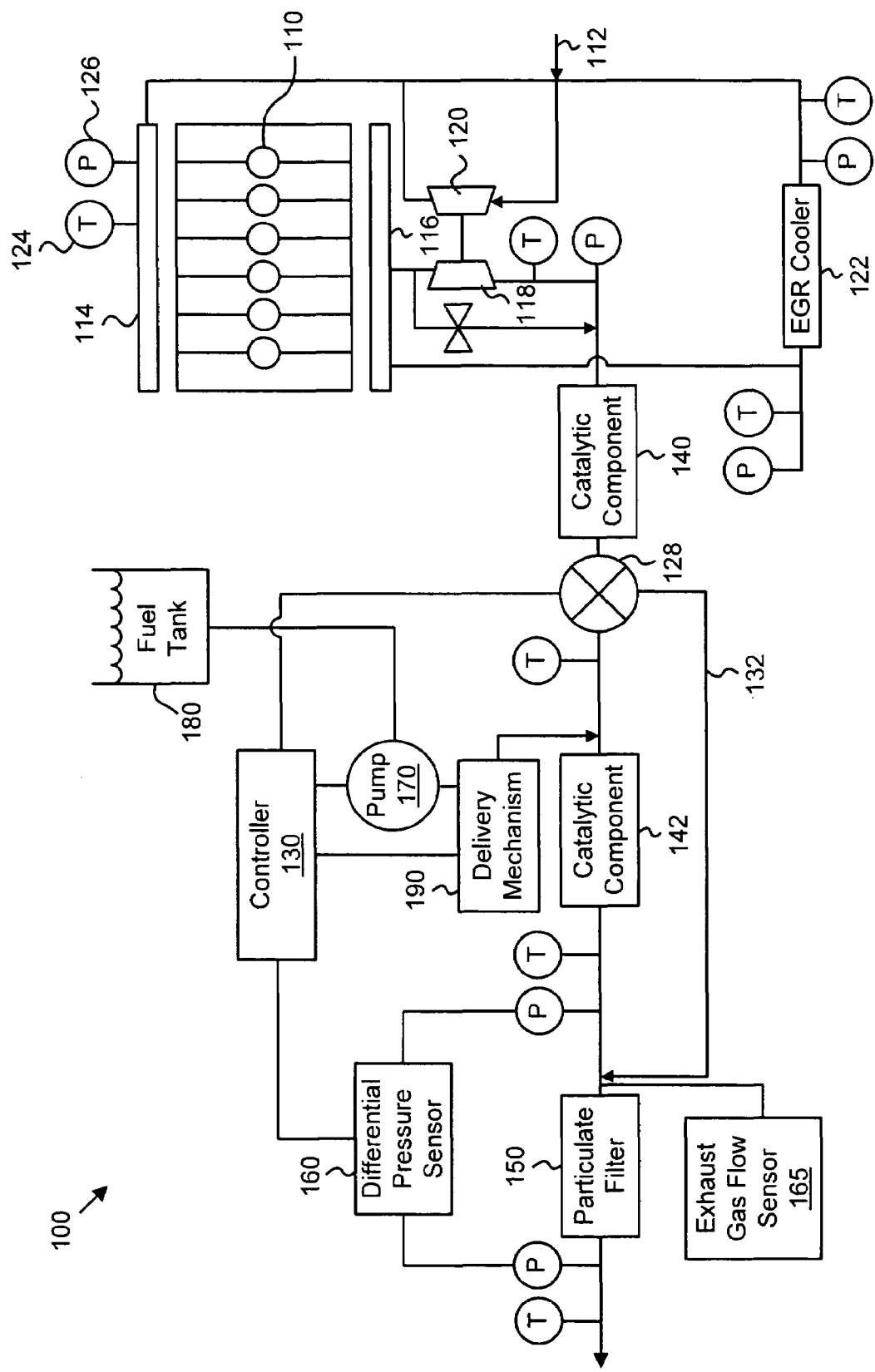
FIG. 1 is a schematic block diagram illustrating one embodiment of an engine system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an internal combustion engine system, such as a diesel engine system 100, in accordance with the present invention. As illustrated, the engine system 100 may include a diesel engine 110, a controller 130, a catalytic component 140 to oxidize engine-out hydrocarbons, a catalytic component 142 to oxidize added hydrocarbons, adsorb $NO_x$, or both, and a particulate filter 150 to trap soot particles from the soot generating source. The engine system 100 may further include various temperature sensors 124, various pressure sensors 126, an air intake 112, a turbine compressor 120, an air intake manifold 114, an exhaust manifold 116, an exhaust turbine 118 that may include a wastegate or variable geometry technology, an exhaust gas recirculation with a cooler 122, an exhaust bypass valve 128, exhaust bypass line 132, a fuel tank 180 which supplies the engine 110 and potentially an external fueling pump 170, an external fueling delivery mechanism 190, an exhaust gas flow sensor 165, and a sensor 160 detecting the differential pressure across the particulate filter 150.

It is readily understood by those in the art that many of the components may not be present in a given system, and that many of the sensors may be virtual calculations based on other parameters rather than a physical device on the system. Further, it is readily understood by those in the art that alternative locations for many of the components are equivalent to the illustrations for one embodiment shown in the engine system 100, and all of these are intended to be included in the scope of the present invention.

Figure 2:
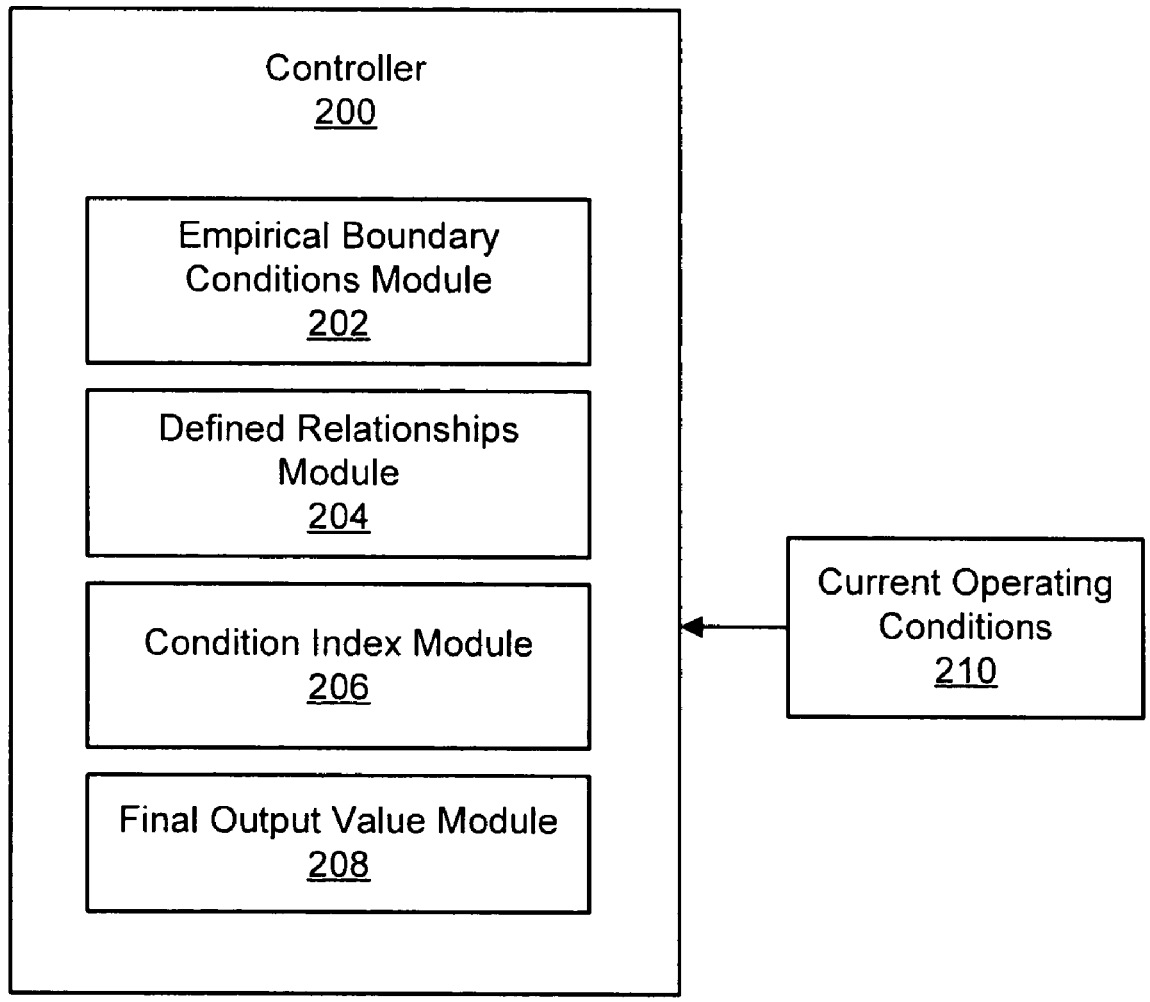
FIG. 2 is a schematic block diagram illustrating one embodiment of a control system in accordance with the present invention.

FIG. 2 shows a controller 200 in accordance with the present invention. A controller, which in one embodiment may be a controller 200 similar in configuration to the controller 130, contains an empirical boundary conditions module 202, a defined relationship module 204, a condition index module 206, and a final output value module 208. The controller 200 obtains the current operating conditions 210 of the system from sensors, from another controller, over a datalink, or the like.

As is known in the art, the controller 200 and components may comprise processor, memory, and interface modules that may be fabricated of semiconductor gates on one or more semiconductor devices mounted on circuit cards. Connections between the modules may be through semiconductor metal layers, substrate-to-substrate wiring, or circuit card traces or wires connecting the semiconductor devices.

The current operating conditions 210 may include whatever parameters for which relationships are available in the defined relationships module 204. For an estimate of the soot consumption rate via oxidation, the current operating conditions 210 might be the temperature of the particulate filter, the current soot loading on the particulate filter, and the oxygen mass fraction of the flow through the particulate filter. For an estimate of the soot consumption rate via noxidation, the current operating conditions 210 might be the temperature of the particulate filter, the current soot loading on the particulate filter, and the $NO_2$ mass flow rate through the particulate filter.

The empirical boundary conditions module 202 is configured to store boundary soot consumption rates which reflect observed soot consumption rates. The empirical boundary conditions module 202 might store an oxidation high rate and an oxidation low rate. The defined relationship module 204 is configured to store soot consumption rates relative to the boundary soot consumption rates, and it is further configured to relate those rates to various operating conditions. In one embodiment, the defined relationship module 204 may store a range of particulate filter temperatures, and relate each temperature to a soot consumption rate as a percentage of the high soot consumption rate.

The condition index module 206 may be configured to combine the current operating conditions 210 with the relationships defined in the defined relationship module 204 to generate a condition index value. The final output value module 208, in one embodiment, is configured to relate the condition index value to a final output value of soot consumption rate.

Figure 3:
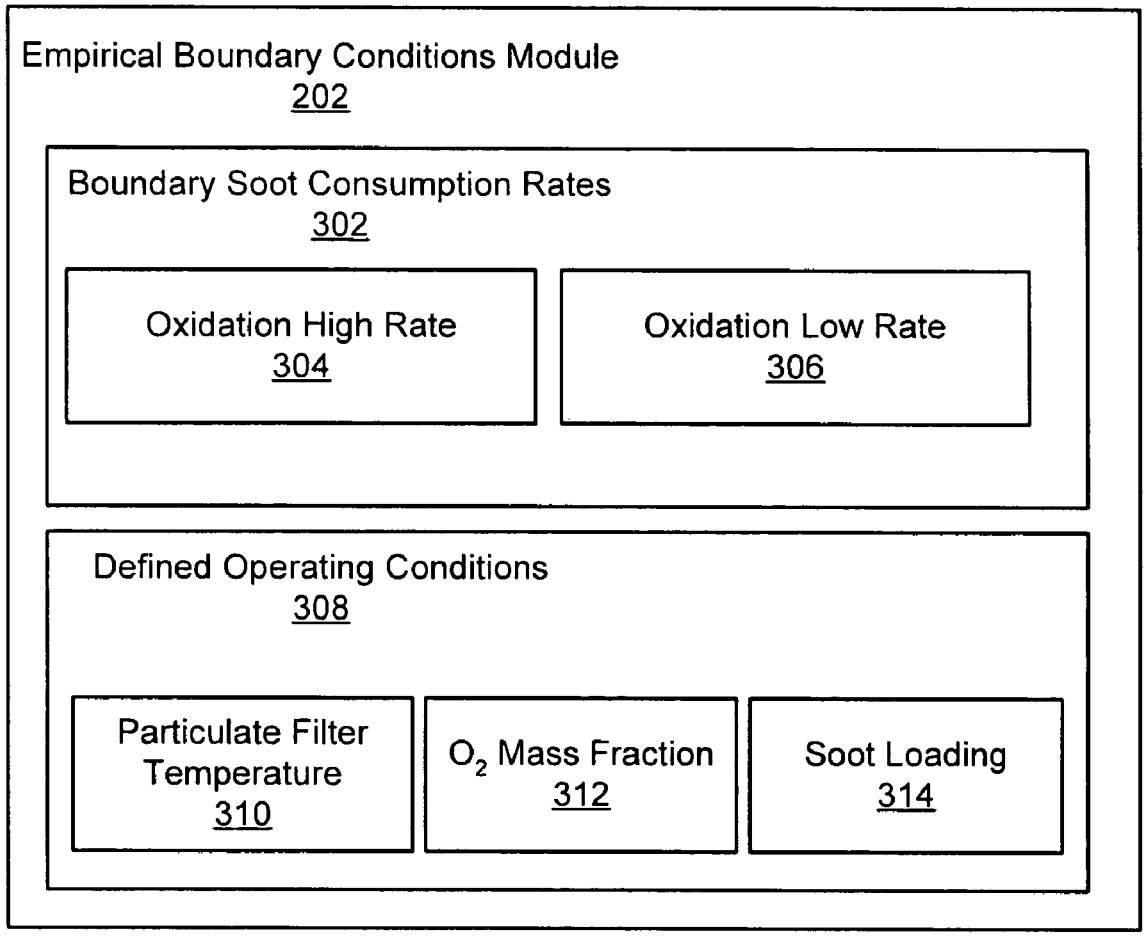
FIG. 3 is a schematic block diagram illustrating one embodiment of an empirical boundary conditions module in accordance with the present invention.

FIG. 3 shows an embodiment of the empirical boundary conditions module 202. In the illustrated embodiment, the empirical boundary conditions module 202 includes a set of boundary soot consumption rates 302, including an oxidation high rate 304, and an oxidation low rate 306. The empirical boundary conditions module 202, in the illustrated embodiment, further includes a set of defined operating conditions 308, including the particulate filter temperature 310, the $O_2$ mass fraction 312, and the soot loading 314. In the illustrated embodiment, the defined operating conditions 308 are the values of the conditions which are associated with the oxidation high rate 304 and the oxidation low rate 306. In one embodiment, the oxidation high rate 304 is 600 grams/hour, the oxidation low rate 306 is 1 gram/hour; the particulate filter temperature 310, $O_2$ mass fraction 312, and soot loading 314 associated with the oxidation high rate 304 are 550 degrees C., 0.12, and 120 grams, respectively; the particulate filter temperature 310, $O_2$ mass fraction 312, and soot loading 314 associated with the oxidation low rate 306 are 350 degrees C., 0.05, and 60 grams, respectively. These values are taken from the current best knowledge on a 15-liter diesel engine, and can be readily determined experimentally on another system by one skilled in the art.

FIG. 4 shows an embodiment of the empirical boundary conditions module 202. FIG. 4 is substantially like FIG. 3, except that the boundary soot consumption rates 302 include a noxidation high rate 316 and a noxidation low rate 318. The defined operating conditions, in one embodiment, differ only in that $NO_2$ mass flow 322 is shown rather than $O_2$ mass fraction, and that the particulate filter temperature 320 and soot loading 324 use a different number to emphasize that the particulate filter temperature estimate 320 for noxidation estimation might be different than the particulate filter temperature estimate 310 for oxidation estimation. The noxidation reaction occurs almost exclusively on a catalytic surface within the particulate filter 150, while at higher temperatures the oxidation reaction can occur in the bulk away from the catalyst. Therefore, in one embodiment, the particulate filter temperature 320 is an estimation of the filter substrate temperature, while the particulate filter temperature 310 is an estimation of the bulk exhaust flow temperature at the center of the particulate filter 150. The invention will perform acceptably even if the same estimate is used for both mechanisms in a particular embodiment.

In one embodiment, the noxidation high rate 316 is 35 grams/hour, the noxidation low rate 306 is 0.175 gram/hour; the particulate filter temperature 320, $NO_2$ mass flow rate 322, and soot loading 324 associated with the noxidation high rate 316 are 325 degrees C., 2400 grams/hour, and 120 grams, respectively; the particulate filter temperature 320, $NO_2$ mass flow rate 322, and soot loading 324 associated with the noxidation low rate 318 are 250 degrees C., 120 grams/hour, and 60 grams, respectively. These values are taken from the current best knowledge on a 15-liter diesel engine, and can be readily determined experimentally on another system by one skilled in the art.

Figure 5:
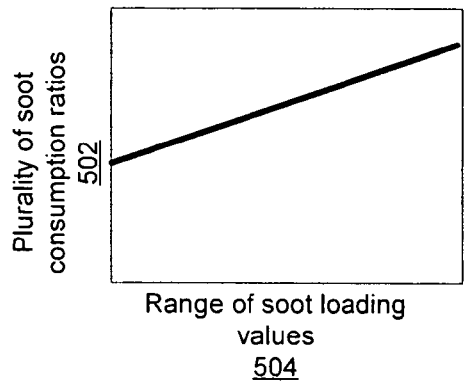
FIG. 5 is a schematic block diagram illustrating one embodiment of a defined relationships module in accordance with the present invention.
Figure 5:
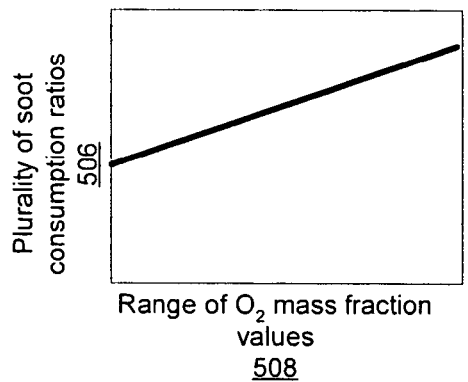
Figure 5:
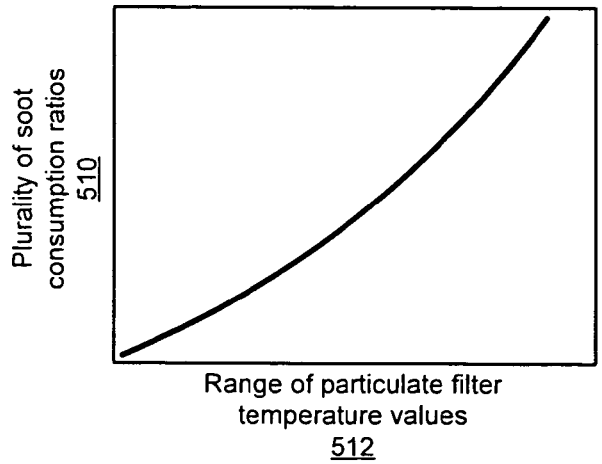

FIG. 5 illustrates one embodiment of the relationships captured in the defined relationships module 204. It is understood by those in the art that the exact relationships affecting reaction rates in a catalytic system are affected by dominant flow regimes, catalyst loading, mass transfer limited systems versus reaction rate limited systems, and the like. Therefore, for a given system, the relationship graphs as shown must be developed by fixing all of the relationships, and experimentally sweeping the value for which a desired relationship is required.

The plurality of soot consumption ratios 502 plotted against the range of soot loading values 504, in one embodiment, shows the soot consumption ratio to be linear with soot loading. The plurality of soot consumption ratios 506 plotted against the range of $O_2$ mass fraction values 508, in one embodiment, shows the soot consumption ratio to be linear with $O_2$ mass fraction. The plurality of soot consumption ratios 510 plotted against the range of particulate filter temperature values 512, in one embodiment, shows the soot consumption rate to be exponential with temperature. Table 1 lists the values indicated by the graphs of FIG. 5 in one embodiment.

TABLE 1

| | | Example of Defined Relationship Module 204 calibration | | | |
|---|---|---|---|---|---|
| Soot consumption ratios 502 | Range of soot loading values 504 | Plurality of soot consumption ratios 506 | Range of $O_2$ mass fraction values 508 | Plurality of soot consumption ratios 510 | Range of particulate filter temperature values 512 |
| 0.00 | 0 grams | 0.08 | 0.01 | 0.001 | 300 |
| 0.17 | 20 grams | 0.42 | 0.05 | 0.004 | 350 |
| 0.33 | 40 grams | 0.67 | 0.08 | 0.016 | 400 |
| 0.50 | 60 grams | 1.00 | 0.12 | 0.031 | 425 |
| 0.67 | 80 grams | 1.25 | 0.15 | 0.063 | 450 |
| 1.00 | 120 grams | | | 0.125 | 475 |
| 1.25 | 150 grams | | | 0.25 | 500 |
| 1.50 | 180 grams | | | 0.50 | 525 |
| | | | | 1.00 | 550 |

Figure 6:
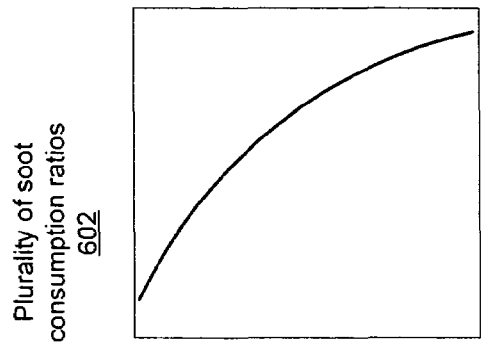
FIG. 6 is a schematic block diagram illustrating another embodiment of a defined relationships module in accordance with the present invention.
Figure 6:
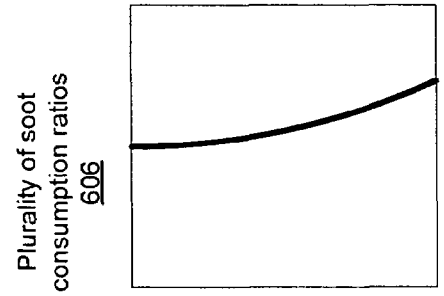
Figure 6:
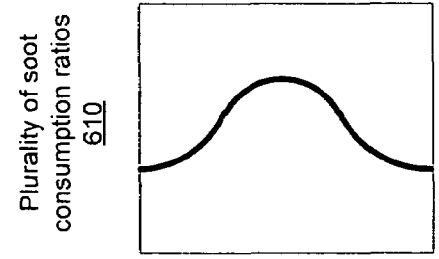

FIG. 6 illustrates another embodiment of the relationships captured in the defined relationships module 204. It is understood by those in the art that the exact relationships affecting reaction rates in a catalytic system are affected by dominant flow regimes, catalyst loading, mass transfer limited systems versus reaction rate limited systems, and the like. Therefore, for a given system, the relationship graphs as shown must be developed by fixing all of the relationships, and experimentally sweeping the value for which a desired relationship is required.

The plurality of soot consumption ratios 602 plotted against the range of soot loading values 604, in one embodiment, shows the soot consumption ratio to increase with the ¼ power of soot loading. The plurality of soot consumption ratios 606 plotted against the range of $NO_2$ mass flow values 608, in one embodiment, shows the soot consumption ratio to increase with the square of $NO_2$ mass flow. The plurality of soot consumption ratios 610 plotted against the range of particulate filter temperature values 612, in one embodiment, shows the soot consumption rate to resemble a bell curve with temperature. Table 2 lists the values indicated by the graphs of FIG. 6 in one embodiment.

708 associated with the oxidation low rate 306, and a high condition index value 708 associated with the oxidation high rate 304. In that embodiment, when the condition index value 708 is at the low value, the final output value is equal to the oxidation low rate 306; when the condition index value 708 is at the high value, the final output value is equal to the oxidation high rate 304.

One skilled in the art will readily be able to determine the appropriate final output value 802 for values of the condition index value 708 above the high value or below the low value, in light of this disclosure. For example, below the low index value the final output value 802 could be zero in one embodiment. Above the high index value the final output value 802 could be a linear extrapolation and yield a final output value 802 higher than the oxidation high rate 304.

TABLE 2

Example of Defined Relationship Module 204 calibration

| Soot consumption ratios 602 | Range of soot loading values 604 | Plurality of soot consumption ratios 606 | Range of $NO_2$ mass flow values 608 | Plurality of soot consumption ratios 610 | Range of particulate filter temperature values 612 |
|---|---|---|---|---|---|
|  |  |  |  | 0.00 | 200 |
| 0 | 0 grams | 0.08 | 120 | 0.071 | 225 |
| 0.193049 | 20 grams | 0.42 | 240 | 0.143 | 250 |
| 0.229575 | 40 grams | 0.67 | 480 | 0.286 | 275 |
| 0.254066 | 60 grams | 1.00 | 960 | 0.857 | 300 |
| 0.273012 | 80 grams | 1.25 | 1440 | 1.000 | 325 |
| 1 | 120 grams |  | 1920 | 0.857 | 350 |
| 1.057371 | 150 grams |  | 2400 | 0.286 | 375 |
| 1.106682 | 180 grams |  |  | 0.143 | 400 |
|  |  |  |  | 0.071 | 425 |
|  |  |  |  | 0.00 | 450 |

Figure 7:
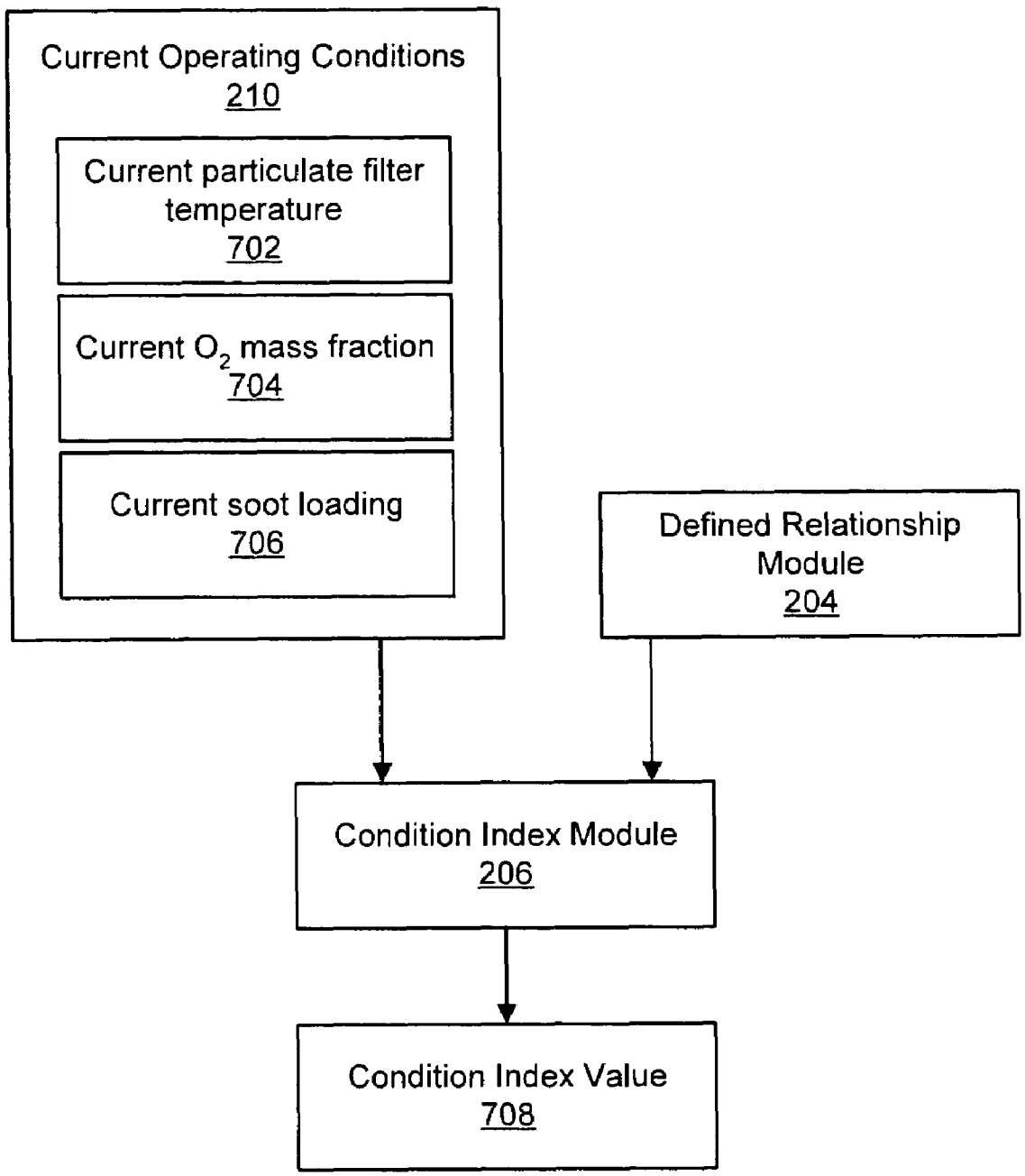
FIG. 7 is a schematic block diagram illustrating one embodiment of the interactions of the current operating conditions, the defined relationships module, and the condition index module to produce a condition index value in accordance with the present invention.

FIG. 7 illustrates one embodiment of a condition index module 206 configured to calculate a condition index value 708 in accordance with the present invention. In one embodiment, the condition index module 206 utilizes information from the current operating conditions 210, with the relationships defined in the defined relationship module 204 to calculate a condition index value 708.

Figure 7A:
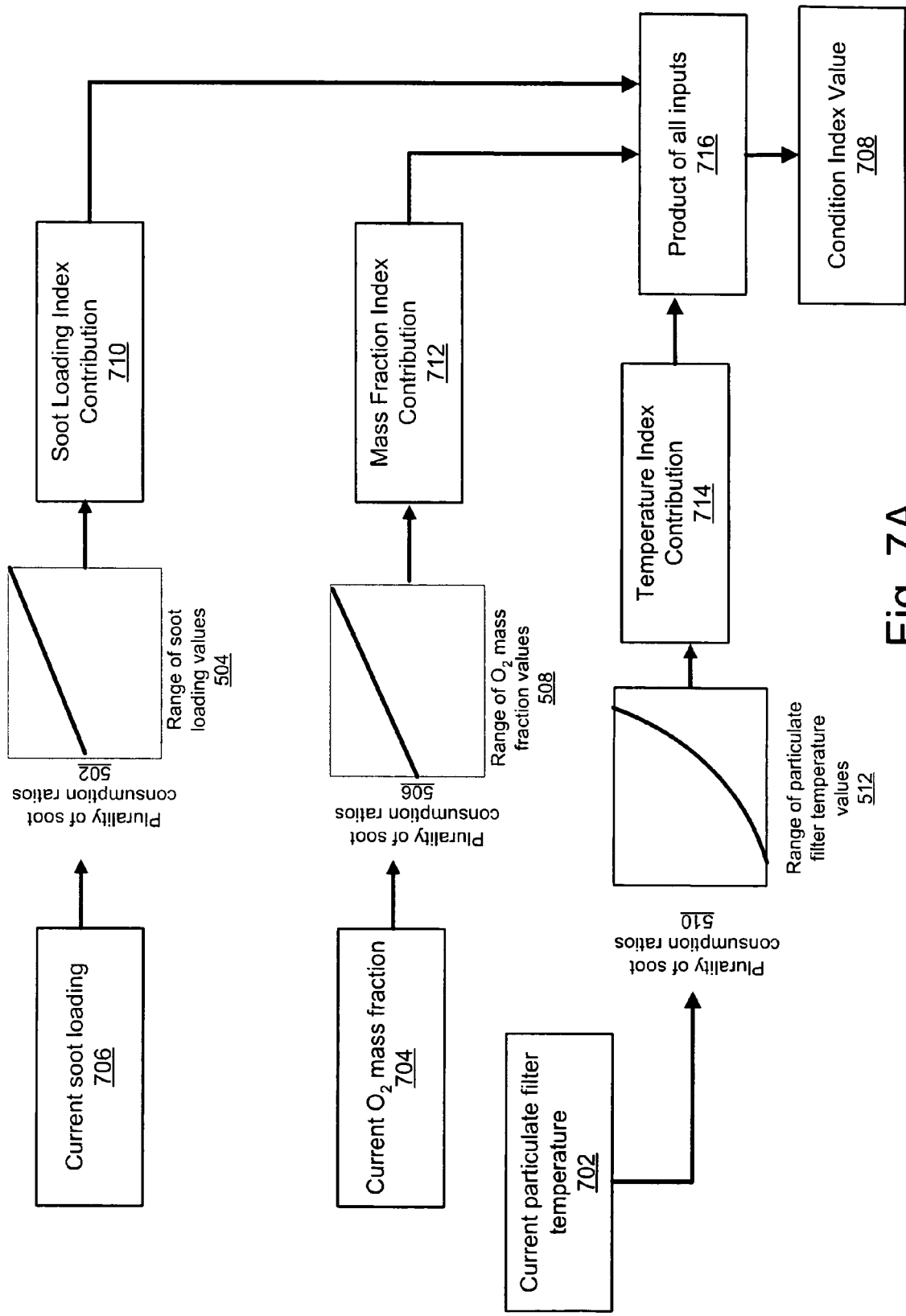
FIG. 7A is a process flow diagram illustrating one embodiment of a method to generate a condition index value in accordance with the present invention.

FIG. 7A illustrates one embodiment of a method to combine the current soot loading 706, current O2 mass fraction 704, and current particulate filter temperature 702, with the various defined relationships to generate a condition index value 708, in accordance with the present invention. In one embodiment, each operating condition and relationship is combined into an index contribution: a soot loading index contribution 710, a mass fraction index contribution 712, and a temperature index contribution 714. In one embodiment, the index contributions are multiplied together in the product of all inputs 716, to generate a condition index value 708. In the present example, the relationships of Table 1 are used for illustration. Therefore, in one embodiment, each index contribution will be a value substantially between 0 and 1—although they need not be as indicated in Table 1—and therefore the condition index value 708 will be a value substantially between 0 and 1.

Figure 8:
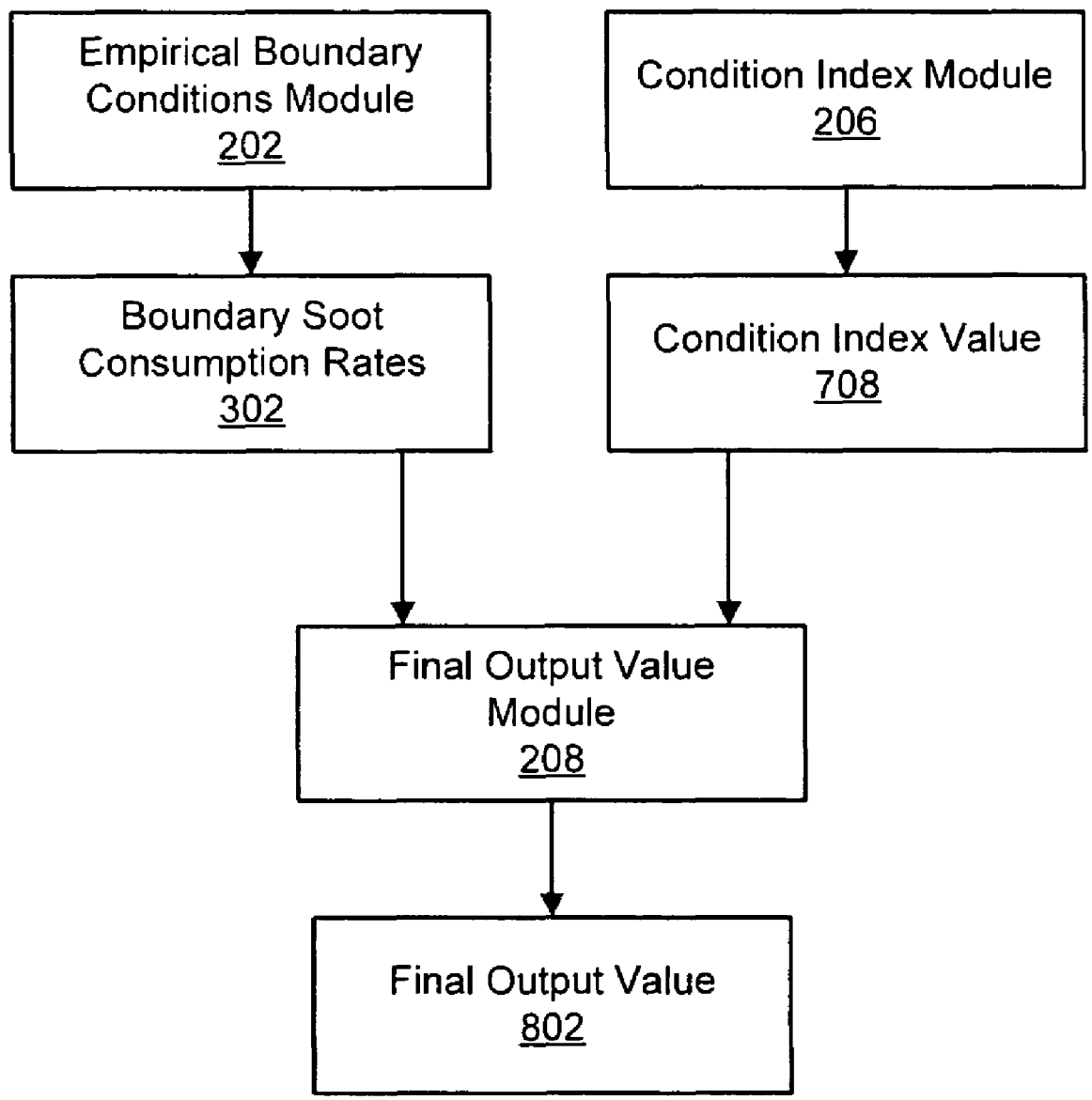
FIG. 8 is a schematic block diagram illustrating one embodiment of the interactions of the condition index value, the boundary soot consumption rates, and the final output value module to produce a final output value in accordance with the present invention.
Figure 9:
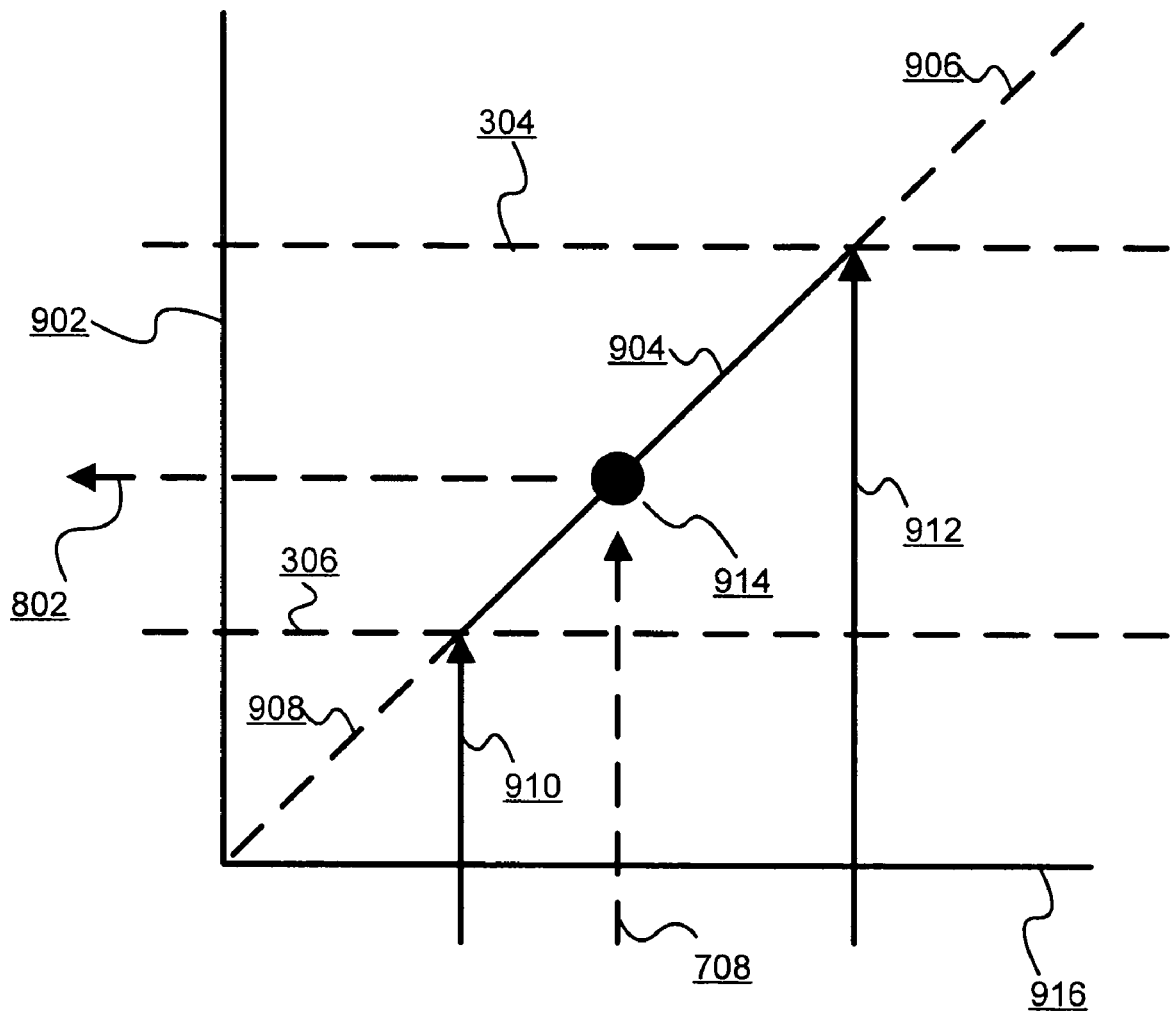
FIG. 9 is a graph illustrating one embodiment of the interactions of the condition index value and the boundary soot consumption rates to determine a final output value in accordance with the present invention.

FIG. 8 shows an embodiment of the final output module 208 generating a final output value 802 in accordance with the present invention. The final output module 208, in one embodiment, is configured to take information from the boundary soot consumption rates 302, and combine it with the condition index value 708 to generate a final output value 802. In one embodiment, there is a low condition index value FIG. 9 illustrates the operation of the final output module 208 as it is configured in one embodiment in accordance with the present invention. The axis 902 represents a soot consumption rate in units of grams per hour in one embodiment. The axis 916 represents the condition index value 708, which is unitless in one embodiment. The condition index high value represented by 912 is associated with the oxidation high rate 304. The condition index low value represented by 910 is associated with the oxidation low rate 306.

In one embodiment, the final output module 208 is configured to output a final output value 802 associated with a condition index value 708 along the operating line 914 whenever the condition index value 708 is between the low condition index 910 and the high condition index 912. In one embodiment, the final output module 208 is further configured to extrapolate along operating line 906 above the high condition index 912, and to extrapolate along operating line 908 below the low condition index 910. In another embodiment, the final output module 208 is configured to output a final output value 802 equal to the oxidation high rate 304 whenever the condition index value 708 is higher than the high condition index 912. In yet another embodiment, the final output module 208 is configured to output a final output value 802 of zero whenever the condition index value 708 is lower than the low condition index 910. In another embodiment, the final output module 208 is configured to output a final output value 802 equal to the oxidation low rate 306 whenever the condition index value 708 is lower than the low condition index 910.

The schematic flow chart diagram that follows is set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 10:
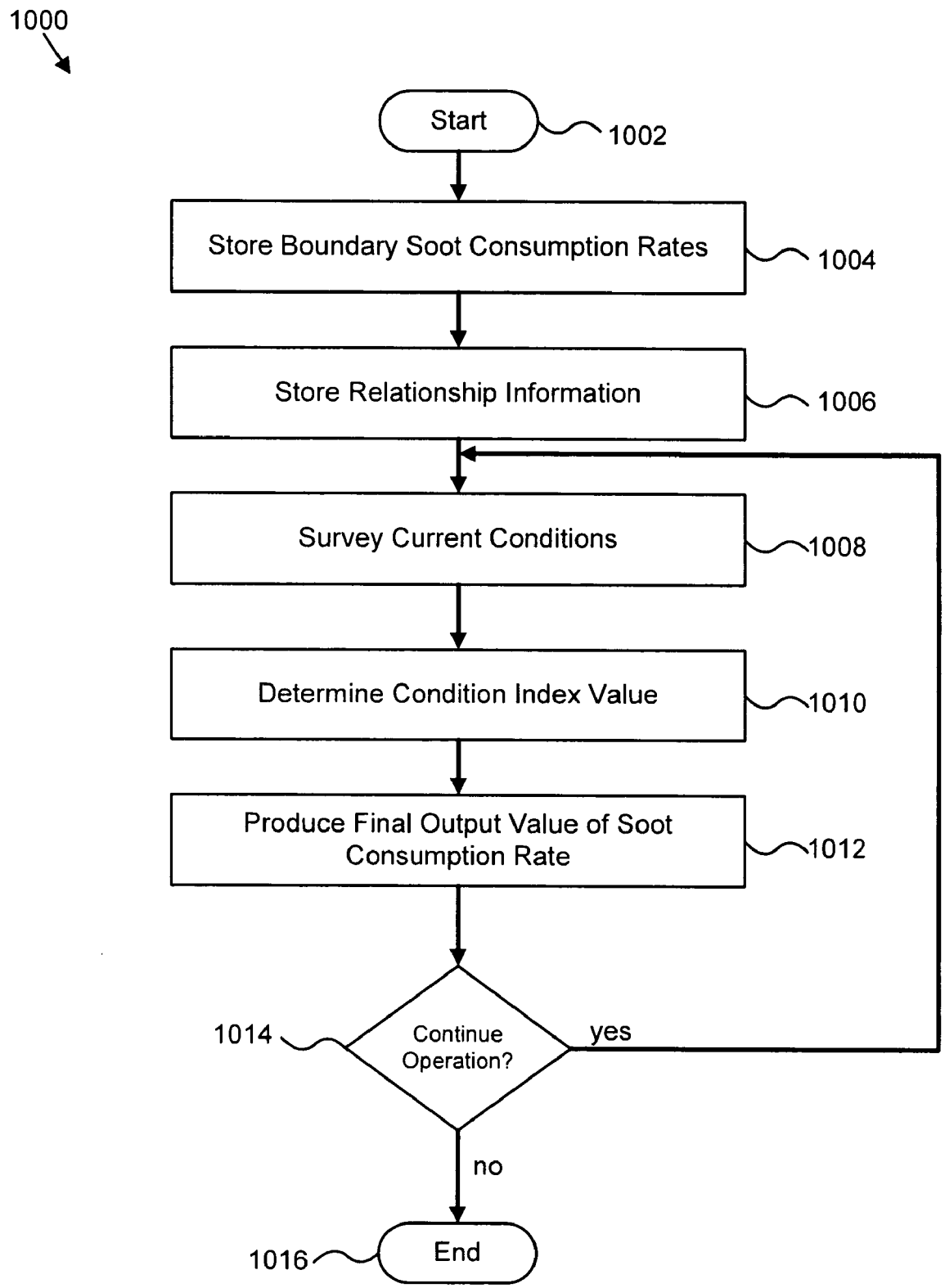
FIG. 10 is a process flow diagram illustrating one embodiment of a method of determining a soot consumption rate in accordance with the present invention.

FIG. 10 illustrates one embodiment of a method 1000 of estimating the current soot consumption rate in the particulate filter 150. The method starts at 1002, and in one embodiment proceeds to store boundary soot consumption rates 1004. Step 1004 occurs only one time during a calibration event, and it need not be executed again. The method continues to the store relationship information step 1006 in one embodiment. In one embodiment, the store relationship information step 1006 occurs only one time during a calibration event, and it need not be executed again. Step 1008 begins what is, in one embodiment, the main execution loop. Step 1008 is a survey of the current conditions, which as previously indicated may be reading values from sensors, datalinks, control modules, performing calculations, and the like. The method proceeds to the determine condition index value step 1010 in one embodiment. In one embodiment, the method then proceeds to produce a final output value of soot consumption rate 1012.

In one embodiment, the method will execute a loop until given an indication that operations should cease, as checked in step 1014. One potential indicator that operations should cease might be the beginning of an engine shutdown procedure after a vehicle operator turns off the key switch. If the method is to continue operation, the controller 200 proceeds back to step 1008 in one embodiment. If there were a calculation of new relationship information or new boundary soot consumption rates in a given embodiment, the method would cycle back to step 1006 or 1004 to store the new relationship. When the decision in step 1014 to continue operation indicates that operations should cease, the method proceeds to 1016 and ends.

FIG. 11 illustrates the best method of calibrating the oxidation high rate value in one embodiment. The vertical axis represents soot loading 1150 on the particulate filter. The horizontal axis represents the observed regeneration time 1160. This graph is used as follows: 1) load up a particulate filter with a known amount of soot, 2) set the regeneration conditions at fixed values—in one embodiment this is a fixed temperature and oxygen mass fraction, 3) perform the regeneration until the design soot loading end point is reached. On the graph, this procedure will begin at the operating point 1108, which is time zero, and a soot loading of the value at the point 1100. On the graph, this procedure will end at the operating point 1110, which is a finite time equal to the time value 1106, and a soot loading equal to the value at 1102.

If the suggested correction from FIG. 11 were not applied, the apparent operating curve for this regeneration would be 1114—i.e. simply a line drawn through the starting and ending operating points. However, because the decrease in soot loading as the regeneration proceeds decreases the rate of soot consumption, the true operating curve is actually curve 1112. The desired oxidation high rate is the slope of the line 1116 rather than the slope of the line 1114. If all parameters except the soot loading have been held constant, the slope 1116 can be derived mathematically if the soot loading to soot consumption rate relationship is known, and this derivation is within the ordinary skill of one in the art in light of this disclosure. To enhance understanding, the equation for the corrected slope 1116 relative to the uncorrected slope 1114 is given for the case where the soot loading relationship is linear, like the embodiment shown in Table 1. The values in Equation 1 are taken from FIG. 11—i.e. the point 1100 is the beginning soot loading as used in the equation, the point 1102 is the ending soot loading, and the time point 1106 is the observed regeneration time.

$$CorrectedRate(g/hr) = \frac{(1100-1102)/[((\ln(1100)-\ln(1102))*(1100/1106)]}{(1102-1100)}$$

Equation 1

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for estimating particulate consumption in a particulate filter, the apparatus comprising:
   an empirical boundary conditions module, the empirical boundary conditions module configured to store first and second boundary soot consumption rates each corresponding to defined operating conditions, wherein the first boundary soot consumption rate is associated with a first condition index value and the second boundary soot consumption rate is associated with a second condition index value;
   a defined relationships module, the defined relationships module configured to store relationship information between a plurality of potential operating conditions, observed soot consumption rates at the plurality of operating conditions, and at least one of the first and second boundary soot consumption rates;
   a condition index module, the condition index module configured to determine a current condition index value according to current operating conditions and the stored relationship information, wherein the current condition index value comprises a contribution of individual index values associated with each of the current operating conditions; and
   a final output value module, the final output value module configured to compare the current condition index value with the first and second condition index values of the first and second boundary soot consumption rates to determine a final output value of current soot consumption rate.

2. The apparatus of claim 1, wherein the first and second boundary soot consumption rates comprise first and second soot consumption rates via oxidation.

3. The apparatus of claim 2, wherein the first and second soot consumption rates via oxidation on the particulate filter comprise an oxidation high rate and an oxidation low rate, the defined operating conditions comprise particulate filter temperature, $O_2$ mass fraction, and soot loading on the particulate filter, the plurality of potential operating conditions comprise particulate filter temperature, $O_2$ mass fraction, and soot loading on the particulate filter, and the stored relationship information comprises a plurality of soot consumption ratios, the ratios comprising the soot consumption rate associated with each of the plurality of potential operating conditions divided by the difference between the oxidation high rate and the oxidation low rate.

4. The apparatus of claim 3, wherein the oxidation low rate equals zero.

5. The apparatus of claim 3, wherein the current condition index value comprises a normalized value on a scale from a low value to a high value, the low value for the current condition index value corresponds to the oxidation low rate, the high value for the current condition index value corresponds to the oxidation high rate, and the final output value module is configured to linearly interpolate between the oxidation low rate and the oxidation high rate for a current condition index value between the low value and the high value.

6. The apparatus of claim 5, wherein the final output value module is further configured to linearly extrapolate below the oxidation low rate for current condition index values below the low value, and linearly extrapolate above the oxidation high rate for current condition index values above the high value.

7. The apparatus of claim 1, wherein the first and second boundary soot consumption rates comprise first and second soot consumption rates via noxidation.

8. The apparatus of claim 7, wherein the first and second soot consumption rates via noxidation on the particulate filter comprise a noxidation high rate and a noxidation low rate, the defined operating conditions comprise particulate filter temperature, $NO_2$ mass flow rate, and soot loading on the particulate filter, the plurality of potential operating conditions comprise particulate filter temperature, $NO_2$ mass flow rate, and soot loading on the particulate filter, and the stored relationship information comprises a plurality of soot consumption ratios, the ratios comprising the soot consumption rate associated with each of the plurality of potential operating conditions divided by the difference between the noxidation high rate and the noxidation low rate.

9. The apparatus of claim 8, wherein the current condition index value comprises a normalized value on a scale from a low value to a high value, the low value for the current condition index value corresponds to the noxidation low rate, the high value for the current condition index value corresponds to the noxidation high rate, the final output value module is configured to linearly interpolate between the noxidation low rate and the noxidation high rate for current condition index values between the low value and the high value, and wherein the final output value module is further configured to linearly extrapolate below the noxidation low rate for cuffent condition index values below the low value, and linearly extrapolate above the noxidation high rate for cuffent condition index values above the high value.

10. A signal bearing medium tangibly embodying a program of machine-readable instructions executable by a digital processing apparatus to perform operations to estimate the rate of particulate consumption in a particulate filter, the operations comprising:
    storing first and second boundary soot consumption rates determined according to defined operating conditions;
    storing relationship information between a plurality of potential operating conditions and the boundary soot consumption rates, the stored relationship information comprising a plurality of soot consumption ratios, each ratio comprising the soot consumption rate associated with a respective one of the plurality of potential operating conditions divided by the difference between the first and second boundary soot consumption rates;
    determining a condition index value determined according to current operating conditions and the stored relationship information; and
    combining the condition index value with the boundary soot consumption rates to produce a final output value of soot consumption rate.

11. The signal bearing medium of claim 10, wherein the first and second boundary soot consumption rates comprise soot consumption rates via oxidation, the first and second boundary soot consumption rates via oxidation comprise an oxidation high rate and an oxidation low rate, the defined operating conditions comprise particulate filter temperature, $O_2$ mass fraction, and soot loading on the particulate filter values, the plurality of potential operating conditions comprise a range of particulate filter temperature, $O_2$ mass fraction, and soot loading on the particulate filter, and wherein the stored relationship information comprises a plurality of soot consumption ratios, the ratios comprising the soot consumption rate associated with each of the plurality of potential operating conditions divided by the difference between the oxidation high rate and the oxidation low rate.

12. The signal bearing medium of claim 11, wherein the condition index value comprises a normalized value on a scale from a low value to a high value, the low value for the condition index value coffesponds to the oxidation low rate, the high value for the condition index value coffesponds to the oxidation high rate, and wherein combining the condition index value with the first and second boundary soot consumption rates comprises linearly interpolating between the oxidation low rate and the oxidation high rate for condition index values between the low value and the high value, and linearly extrapolating below the oxidation low rate for condition index values below the low value, and linearly extrapolating above the oxidation high rate for condition index values above the high value.

13. The signal bearing medium of claim 10, wherein the first and second boundary soot consumption rates comprise soot consumption rates via noxidation, the first and second boundary soot consumption rates via noxidation comprise a noxidation high rate and a noxidation low rate, the defined operating conditions comprise particulate filter temperature, $NO_2$ mass flow rate, and soot loading on the particulate filter, the plurality of potential operating conditions comprise particulate filter temperature, $NO_2$ mass flow rate, and soot loading on particulate filter, and wherein the stored relationship information comprises a plurality of soot consumption ratios, the ratios comprising the soot consumption rate associated with each of the plurality of potential operating conditions divided by the difference between the noxidation high rate and the noxidation low rate.

14. The signal bearing medium of claim 13, wherein the condition index value comprises a normalized value on a scale from a low value to a high value, the low value for the condition index value coffesponds to the noxidation low rate, the high value for the condition index value coffesponds to the noxidation high rate, and wherein combining the condition index values with the first and second boundary soot consumption rates comprises linearly interpolating between the noxidation low rate and the noxidation high rate for condition index values between the low value and the high value, and linearly extrapolating below the noxidation low rate for condition index values below the low value, and linearly extrapolating above the noxidation high rate for condition index values above the high value.

15. An exhaust gas after-treatment system for determining the rate of soot consumption on a particulate filter, the system comprising:
- a particulate filter configured to capture particulate matter from an exhaust gas stream;
- a temperature sensor configured to estimate the particulate filter temperature;
- a flow rate sensor configured to estimate the mass flow rate of exhaust through the particulate filter;
- an $O_2$ estimator configured to estimate the mass fraction of $O_2$ through the particulate filter;
- a soot load estimator configured to estimate the soot loading on the particulate filter; and
- a controller configured to store a high rate of soot oxidation and a low rate of soot oxidation based on defined operating conditions, the high rate of soot oxidation being associated with a high rate condition index and the low rate of soot oxidation being associated with a low rate condition index, to store relationships between a plurality of potential operating conditions, observed soot consumption rates at the plurality of potential operating conditions, and at least one of the high and low soot oxidation rates, to determine a current conditions index determined according to current operating conditions, the current conditions index comprising a contribution of individual index values associated with each of the current operating conditions, and to compare the current conditions index with the high rate conditions index and low rate conditions index to determine a rate of soot consumption on the particulate filter.

16. The system of claim 8, further comprising an internal combustion engine that produces exhaust gas as a byproduct of operation, wherein the internal combustion engine is fluidly coupled to the particulate filter, wherein the operating conditions of the exhaust gas aftertreatement system are influenced by the current operating conditions of the engine, and wherein the defined operating conditions of the exhaust gas aftertreatement system are influenced by the combustion related hardware characteristics of the engine.

* * * * *